United States Patent Office 3,299,034
Patented Jan. 17, 1967

3,299,034
SIZING AGENTS AND PROCESSES FOR
PREPARATION THEREOF
Osamu Nishiura, Nishinomiya-shi, Sadao Mano, Amagasaki-shi, Isao Morikawa, Nishinomiya-shi, and Kiyoshi Yakahashi, Tokyo, Japan, assignors to Japan Reichhold Chemicals, Inc., Tokyo, Japan, a corporation of Japan
No Drawing. Filed Aug. 31, 1965, Ser. No. 484,098
Claims priority, application Japan, Mar. 7, 1961,
36/7,106
7 Claims. (Cl. 260—101)

This application is a continuation-in-part of our copending application Serial No. 130,259, filed August 9, 1961, now abandoned.

This invention relates to modified petroleum resin compositions and water-soluble paper sizing agents obtained through alkali saponification thereof. More particularly, this invention relates to modified petroleum resin compositions having an acid number of at least 75, containing at least one kind of organic radical selected from the group consisting of a carboxyl group (—COOH), a carboxylic ester group (—COOR) (wherein R represents an alkyl radical) and nitrile group (—CN).

This invention also relates to water-soluble petroleum resin paper sizing agents characterized in alkali saponification of modified petroleum resins obtained through heating and copolymerizing a rosin (a) and at least one kind of unsaturated organic compound (b) selected from the group consisting of unsaturated organic acids, unsaturated organic acid esters and unsaturated nitriles with the cracking oil of naphtha (c) boiling at above 130° C. with or without the presence of catalysts.

Further, this invention relates to processes for preparing water-soluble petroleum resin sizing agents having an improved melting point and acid number characterized in alkali saponification of the aforesaid polymers after modifying the same by reacting aldehydes or unsaturated polybasic acids therewith.

In a more specific aspect, this invention relates to a method of preparing a water-soluble petroleum resin sizing agent which comprises reacting rosin (a), unsaturated organic compounds (b), and a cracked oil of naphtha (c) at 15 to 250° C. for 3 to 25 hours to prepare a copolymer (d). Said copolymer (d) may be further reacted with aliphatic aldehydes having 1 to 4 carbon atoms including paraformaldehyde or with α,β-unsaturated polybasic acids having 3 to 5 carbon atoms to prepare a copolymer (e). The thus obtained copolymer (d) or (e) may be alkali saponified. The cracked naphtha (c) has a boiling point above 130° C., and contains as its principal components unsaturated cyclic compounds such as styrene derivatives, indene derivatives, cumarene derivatives, etc.

Preferably, the fraction of the cracked naphtha which boils at a temperature up to 280° C. is above 70% by weight. A cracked naphtha whose refractive index is within the range of 1.45 to 1.65, and whose bromine number is within the range of 50 to 150 is preferably used.

As a paper sizing agent, the alkali saponified product of a rosin or of a so-called rosin maleic anhydride adduct which is obtained by adding an α,β-unsaturated polybasic acid such as maleic anhydride to rosin is hitherto well known.

However, because those sizing agents have, as an inevitable trend of natural goods, a great fluctuation of the market prices, a research for new synthetic sizing agents to take the place thereof have been being carried on in recent years. One manifestation of such research has been an attempt to make a petroleum resin a material of such sizing agents.

Because of the possibility of its future supply at more reasonable prices in concomitance with the development of the petrochemical industry and of its contact angle with water being greater than that of a rosin, a petroleum resin is considered to be a suitable material for sizing agents. However, because petroleum resins on the market do not have any functional group other than some double bonds and are insoluble in water, there is no other way than emulsifying them in order to use them as sizing agents. In fact, all that have been made public in publications so far as emulsion-type sizing agents. For instance, in the specification of U.S. Patent No. 2,502,080, it is described that a petroleum resin dispersion obtained by melting and mixing a petroleum resin-wood rosin composition with an alkali aqueous solution is useful as a paper sizing agent. Also in Journal of the Japanese Technical Association of Pulp and Paper Industry, 13, No. 6, p. 385 (1959) and 13, No. 8, p. 602 (1959), it is reported that an emulsion obtained through emulsifying a petroleum resin by the use of an emulsifier obtained through copolymerization of the cracked oil of naphtha shows an excellent effect as a paper sizing agent.

However, those emulsion-type sizing agents, due to incomplete mechanical stability thereof, frequently cause coagulation of the resinous material and gums on the pulp handling equipment or paper machine part and the emulsifier sometimes reduces the sizing effect. An unfavorable influence with respect to the sizing effect stemming from a solvent frequently added as a melting point modifier upon emulsification and its smell or the impossibility of usage in cold northern district due to bad freeze-thaw stability are the defects of said emulsion-type sizing agents. Further, since a petroleum resin does not have any functional group, the emulsion-type sizing agents are insufficient in their fixity to a pulp; therefore, it is not always easy to obtain paper of excellent size value.

An object of this invention is to provide water-soluble petroleum resin sizing agents of excellent sizing effect to take the place of existing emulsion-type petroleum resin sizing agents having the aforesaid defects.

A further object of this invention is to provide a process for producing a petroleum resin composition having an acid number of at least 75 and containing at least one kind of an organic radical selected from the group consisting of a carboxyl group, a carboxylic ester group and a nitrile group.

Yet a further object of this invention is to provide a process for producing a water-soluble petroleum resin paper sizing agent being an alkali saponification of a modified petroleum resin obtained by heating and copolymerizing a rosin and at least one kind of unsaturated organic compound selected from the group consisting of unsaturated organic acids, unsaturated organic acid esters and unsaturated nitriles with a petroleum naphtha.

Still a further object of the present invention is to provide a process for producing water-soluble petroleum resin sizing agents being an alkali saponification of the aforedescribed polymers after modifying the same by reacting aldehydes or unsaturated polybasic acids therewith.

Further objects and advantages of the present invention will become apparant from the following more detailed description of the present invention.

The objects and advantages of the present invention can be achieved by preparing modified petroleum resins by copolymerizing a cracked oil of naphtha boiling at about 130° C. with a rosin and an unsaturated compound having a caboxyl group, a carboxylic ester group or a nitrile group such as unsaturated organic acids, unsaturated organic acid esters or unsaturated nitriles, with subsequent alkali saponifying of the same.

Also, when these copolymers are further reacted with aldehydes or unsaturated polybasic acids, they are modified to polymers having a high melting point or large acid number. Accordingly, when these further modified polymers are alkali saponified, sizing agents having an especially excellent sizing effect are obtained.

The composition of the components contained in the cracked oil of naphtha boiling at about 130° C. used as a material in this invention is not always constant but depends upon the conditions of its thermal cracking; however, it is usually common that the oil contains a plurality of the following active olefins:

Styrene derivatives

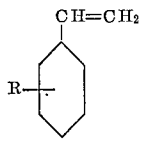

Indene derivatives

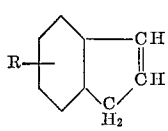

Cumarone derivatives

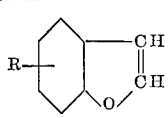

Dicyclopentadiene compounds, for instance

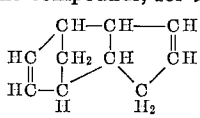

Vinyl naphthalene derivatives

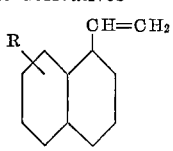

As the rosins which are suitable in this invention, such rosins as gun rosin, wood rosin or tall oil rosin are enumerated.

As the unsaturated organic acid, an aromatic or aliphatic unsaturated monobasic acid is suitable. Such acids include acrylic acid, methacrylic acid, crotonic acid, soy bean oil fatty acid, linseed oil fatty acid and tall oil fatty acid, etc. Suitable $\alpha,\beta$-unsaturated polybasic acids and anhydrides thereof include maleic acid or anhydride, fumaric acid, itaconic acid, etc.

As the unsaturated organic acid esters, the alkyl esters of the unsaturated organic acids mentioned above with alcohols of 1–4 carbon atoms are used. Especially desirable are mono- or di-alkyl esters of unsaturated organic acids such as methyl maleate, ethyl maleate, methyl fumarate, ethyl fumarate, methyl itaconate, ethyl itaconate, methyl acrylate, ethyl acrylate, ethyl methacrylate, propyl methacrylate, and butyl methacrylate.

As the unsaturated nitriles, nitriles of the aforementioned acids such as acrylonitrile or metacrylonitrile can be used.

When these unsaturated compounds and a rosin are reacted with the aforedescribed cracked oil of naphtha, the double-bond portions of said compounds additionally polymerize with those of the active components of the cracked oil of naphtha, forming copolymers. When an unsaturated organic acid is used as the unsaturated compound, —COOH groups are introduced into the copolymers. On the other hand, when an unsaturated organic acid ester or an unsaturated nitrile is used, —COOR groups (wherein R represents alkyl groups such as methyl or ethyl group) or —CN groups are introduced into the polymers. When these polymers containing —COOH, —COOR or —CN groups are further alkali saponified, the —COOH becomes neutralized, and —COOR and —CN become hydrolyzed, each becoming water-soluble —COOM groups (wherein M represents an alkali metal). Of course, these unsaturated compounds are not limittd to one kind, but co-employment of two or more kinds optionally is possible. That this copolymerization is an addition copolymerization is apparently proved from the alkali solubility of the obtained copolymer and the transparency of the solution. (It is impossible to obtain a transparent solution even if an ordinary petroleum resin failing to have carboxyl group is melted with a rosin and thereafter alkali saponified.) That this product is a copolymer is also apparent in view of the large acid number of the fractionated precipitate of the reaction product by methanol.

Generally, the acid number and the melting point of sizing agents are related to its fixity to paper and its adaptability to the temperature of a dryer. In fact, they are in many cases important factors exerting influence upon the release from the dryer, pitch trouble and sizing effect of paper. In this invention, it is possible to improve such properties by further reacting the aforesaid copolymers of the cracked oil of naphtha and unsaturated compounds with aldehydes or unsaturated polybasic acids.

Namely, when 100 parts by weight of said polymer and 2 to 6 parts by weight of aliphatic aldehyde having 1 to 4 carbon atoms, such as formaldehyde, paraformaldehyde or acrolein, are reacted with heating, methylene bonding takes place among molecules and the melting point of the polymer is raised. At this time, the reaction can be carried out in the presence of usual acid catalysts. Also, by reacting with heating to 150 to 250° C. 100 parts by weight of said polymer and 3 to 15 parts by weight of $\alpha,\beta$-unsaturated polycarboxylic acids having 3 to 5 carbon atoms such as maleic anhydride, fumaric acid and itaconic acid, it is possible to raise the melting point as well as the acid number of the polymer.

When the modified polymers whose melting point and/or acid number being improved as such are alkali saponified as mentioned above, even more excellent water-soluble petroleum resins can be obtained.

As mentioned previously, the components and reactivity of the cracked oil of naphtha (c) are not always constant. Accordingly, at the time of the reaction thereof with unsaturated compounds (a) and (b), the content of —COOH, —COOR or —CN groups contained in the polymers (d) formed varies. However, the content of these acid groups of the copolymers is necessarily equivalent to an acid number of at least 75, desirably above 85. Such copolymers, whose acid number is above 75, give a completely transparent aqueous solution by alkali saponification. The degree of the alkali saponification need not necessarily be 100%, but need only be one by which the copolymer is made to be water-soluble.

The fraction of the cracked oil of naphtha at 130–200° C. has a light color, whereas the fraction at a temperature of above 200° C. has a dark color. Therefore, these can be used differently according to the purpose to which they are to be used. For instance, when the former is reacted with a light color rosin (for instance WG grade), a light color copolymer suitable as a sizing agent for a bleached pulp is obtained, whereas when the latter is reacted with a deep color rosin, a copolymer suitable as a sizing agent for an unbleached pulp is formed.

In the copolymerization of the cracked oil of naphtha with unsaturated compounds such as rosin, etc., the catalysts are not always necessary. However, when catalysts used for a usual vinyl polymerization, for instance, radical-type polymerization catalysts such as hydrogen peroxide, benzoyl peroxide, ditertiarybutyl peroxide and ones used upon making a petroleum resin, for instance, Friedel-Crafts-type catalysts such as boron trifluoride, aluminum chloride and zinc chloride are used as occasion demands, the copolymerization proceeds more effectively than when no catalyst is used. For instance, when these catalysts are not used in the copolymerization reaction, a temperature of 150 to 250° C. and a reaction period of 5 to 25 hours are required, whereas when radical-type catalysts are used, the temperature and reaction period required become 100 to 250° C. and 3 to 15 hours, respectively, and when Friedel-Crafts-type catalysts are used, the temperature and reaction period become 15 to 150° C. and 3 to 25 hours, respectively.

The use of these catalysts in the amount of approximately 1% of the entire amount is sufficient to achieve the desired result.

Hereinafter, this invention will be explained with reference to examples. However, since these examples only illustrate the modes of the embodiment of this invention, this invention is not to be limited to those modes only. Unless otherwise mentioned, parts represent parts by weight in all examples described hereinbelow.

Example 1

550 parts of oil boiling at above 175° C. which is commonly called as "ethylene bottom" obtained as a by-product when a petroleum naphtha is cracked to produce ethylene were reacted with 500 parts of an FF grade wood rosin and 60 parts of maleic acid with stirring in a carbon dioxide stream at 240° C. for 5 hours. Thereafter the fraction of the content distilled off when the temperature of the content being below 210° C. under the reduced pressure of 5 mm. Hg was removed. Thereby, 835 parts of a dark color, transparent copolymer (I) having a melting point of 65–68° C. (capillary method) and an acid number of 132 were obtained. At the reaction, unless water contained in the rosin was driven out of the system by the use of a decanter, the expected reaction temperature could not be obtained. Under this condition, almost all active components of the ethylene bottom reacted with the rosin and maleic acid, the reaction thereof being 51.5%.

One hundred parts of the thus obtained resin were melted by heating to 130° C. The melted resin was thrown into the caustic soda aqueous solution heated to 70° C. in advance consisting of 9.0 parts of a caustic soda and 100 parts of water and stirred for 2 hours, the resin being completely dissolved and a liquid saponified product being obtained. Next the product was cooled to 70° C., water being gradually added thereto and the product was made into a solution containing 30% solids. The solution thus obtained was a dark color, completely transparent, low-viscosity solution. This was named paper sizing agent (A) according to this invention.

An unbleached kraft pulp (freeness 30° SR) was dispersed in water in order that the concentration might become 1%. While the mixed solution was being stirred with a pulp defibrator, a prescribed amount of the aforesaid sizing agent (A) calculated as resin solid based on the dry pulp was added thereto. Further, an aluminium sulfate was added thereto. After the pH of the pulp slurry was adjusted to 4.5, said mixed solution was sufficiently stirred and mixed. Thereafter, paper of 60 g./m.² was prepared by common method by the use of the TAPPI (The Technical Association of Pulp and Paper Industry) Standard Sheet Machine and said paper was dried at 100° C. for 5 minutes.

The size value of the paper thus prepared was measured by Stockigt method of JIS (Japan Industrial Standard)–P-8122 and the burst strength of said paper was measured by Mullen's burst strength tester.

For the purpose of reference, the size value and the burst strength of the paper prepared from the same pulp by the same method by the use of the hitherto well-known rosin maleic anhydride adduct sizing agent were measured and compared with those mentioned above. The results were demonstrated in the following Table 1.

TABLE 1

| Amount of sizing agent added (solid per pulp) percent | Size value (seconds) | | | Burst strength ratio (percent) | | |
|---|---|---|---|---|---|---|
| | Sizing Agent (A) of this invention | Goods (A) on the market | Goods (B) on the market | Sizing Agent (A) of this invention | Goods (A) on the market | Goods (B) on the market |
| 0.3 | 19 | 14 | 11 | 2.48 | 2.38 | 2.36 |
| 0.5 | 28 | 22 | 20 | 2.45 | 2.38 | 2.35 |
| 1.0 | 35 | 29 | 27 | 2.35 | 2.35 | 2.24 |
| 2.0 | 40 | 39 | 34 | 2.28 | 2.18 | 2.16 |

The burst strength ratio means $$\frac{\text{burst strength}}{\text{basis weight}} \times 100$$

and both goods (A) and (B) on the market were well-known rosin maleic anhydride adduct sizing agents.

The relation between the amount of the aluminium sulfate added and the size value when paper was prepared by the same method as mentioned above by the co-employment of aluminium sulfate was as demonstrated in the following Table 2, showing that in the case of the sizing agent of this invention, the addition of a small amount of aluminium sulfate resulted in a good size value.

TABLE 2

| Amount of aluminum sulfate added (solid per pulp) percent | Size value (seconds) | | | | | |
|---|---|---|---|---|---|---|
| | Sizing agent and its amount added (per pulp) | | | | | |
| | Sizing agent (A) of this invention | | Goods (A) on the market | | Goods (B) on the market | |
| | 0.7% | 2.0% | 0.7% | 2.0% | 0.7% | 2.0% |
| 0.5 | 3 | 20 | 0 | 1 | 0 | 1 |
| 0.7 | 10 | 22 | 0 | 3 | 1 | 2 |
| 1.0 | 15 | 26 | 0 | 5 | 1 | 2 |
| 1.5 | 21 | 29 | 3 | 20 | 4 | 17 |
| 2.0 | 26 | 35 | 5 | 27 | 4 | 26 |
| 2.5 | 28 | 38 | 16 | 30 | 13 | 39 |

The size value was measured in seconds and both goods (A) and (B) were well-known rosin maleic anhydride adduct sizing agents.

Example 2

An autoclave was charged with 600 parts of the cracked oil of naphtha having a boiling point of 150–200° C. which is a material of a petroleum resin called $C_9$ fraction 800 parts of a WG grade wood resin and 70 parts or itaconic acid, and the mixtures were reacted by heating at 210° C. for 15 hours. During this peroid the pressure was maintained between 2 and 3 kg./cm.$^2$. After the reaction, the content was distilled under the reduced pressure of 50 mm. Hg and the unreacted fraction distilled off when the temperature of the content was below 230° C. being removed. Thereby 1090 parts of a light color, transparent polymer having a melting point of 63–65° C. (capillary method) and an acid number of 148 were obtained. One hundred parts of said resin were melted by heating to 130° C., and the melted resin was thrown into the caustic soda aqueous solution heated to 70° C. in advance consisting of 10.5 parts of a caustic soda and 100 parts of water. Thereafter the mixture was stirred at 90° C. for 1 hour. The resin was saponified and solubilized, becoming a light color, transparent saponified product. Next, the saponified product was cooled to 70° C., water being added thereto at this temperature, whereby it was made into a solution containing 35% solids. The solution thus obtained was a light color, transparent, low-viscosity solution, being named paper sizing agent (B) according to this invention.

Using this sizing agent (B), by the same method as in Example 1, paper of 60 g./m.$^2$ was prepared from a bleached sulfite pulp (freeness 45° SR), the size value and the burst strength thereof being measured. Those figures were compared with those of the paper prepared by the use of hitherto well-known rosin maleic anhydride adduct sizing agent same as in the case of Example 1. The results were as demonstrated in the following Table 3.

TABLE 3

| Amount of sizing agent added (solid per pulp) percent | Size value (seconds) | | Burst strength ratio (percent) | |
|---|---|---|---|---|
| | Sizing agent (B) of this invention | Goods (A) on the market | Sizing agent (B) of this invention | Goods (A) on the market |
| 0.3 | 3 | 2 | 2.62 | 2.46 |
| 0.5 | 15 | 11 | 2.45 | 2.28 |
| 1.0 | 18 | 13 | 2.23 | 2.18 |
| 2.0 | 20 | 17 | 2.25 | 2.00 |
| 3.0 | 25 | 20 | 2.15 | 1.84 |

Goods (A) on the market was a well-known rosin maleic anhydride adduct sizing agent.

Example 3

300 parts of the cracked oil of naphtha-rosin-maleic acid polymer (I) obtained in Example 1 and 50 parts of maleic anhydride were further reacted in carbon dioxide stream at 200° C. for 6 hours, whereby 312 parts of a dark color, transparent polymer having a melting point of 75–77° C. (capillary method), 9–10° C. higher than that of the copolymer (I) and an acid number of more than that of the copolymer (I) were obtained.

One hundred parts of the resin thus obtained were melted by heating to 130° C. The melted resin was thrown into the caustic soda aqueous solution heated to 70° C. in advance consisting of 12.5 parts of a caustic soda and 100 parts of water and the mixture was stirred at 90° C. for 1 hour. The resin, being saponified, was easily solubilized and a dark color, transparent saponified solution was obtained. Next, said solution was cooled to 60° C., water being gradually added thereto, and the solution was made into a solution containing 40% solids. This was named paper sizing agent (C) according to this invention.

Using this sizing agent (C), paper was prepared by the same method as in Example 1, the size value and the burst strength thereof being measured. When those figures were compared with those of the paper prepared by the use of hitherto well-known rosin maleic anhydride adduct sizing agent, the results were as demonstrated in the following Table 4.

TABLE 4

| Amount of sizing agent added (solid per pulp) percent | Size value (seconds) | | Burst strength ratio (percent) | |
|---|---|---|---|---|
| | Sizing agent (C) of this invention | Goods (C) on the market | Sizing agent (C) of this invention | Goods (C) on the market |
| 0.3 | 19 | 10 | 2.45 | 2.36 |
| 0.5 | 24 | 18 | 2.43 | 2.35 |
| 1.0 | 30 | 27 | 2.30 | 2.24 |
| 1.5 | 33 | 31 | 2.27 | 2.22 |

Goods (C) on the market was a well-known rosin maleic anhydride adduct sizing agent.

Example 4

Seven hundred parts of the cracked oil of naphtha boiling at above 130° C. 600 parts of a WW grade tall oil rosin and 86 parts of ethyl acrylate were reacted by heating at a temperature of 220–230° C. for 15 hours in an autoclave (during the period the pressure showed 5–6 kg./cm.$^2$). After the reaction the content was distilled under the reduced pressure of 5 mm. Hg, the unreacted fraction distilled off when the temperature of the content was below 210° C. being removed. Thereby 980 parts of a dark color, transparent polymer having a melting point of 50–53° C. (capillary method) and an acid number of 110 were obtained.

One hundred parts of this resin were melted by heating to 130° C. The melted resin was thrown into the caustic soda aqueous solution heated to 70° C. in advance consisting of 10.5 parts of a caustic soda and 100 parts of water and the mixture was stirred at a temperature of 90–95° C. for 1½ hours. A dark color, transparent saponified product was obtained. This product was cooled to 70° C., water being added thereto at said temperature, and the product was made into a solution containing 50% solids. This was named paper sizing agent (D) according to this invention.

Using this sizing agent (D) and an aluminum sulfate, paper of 60 g./m.$^2$ was prepared from a bleached sulfite pulp (freeness 27° SR) by the same method as in Example 1. The relation between the amount of aluminum sulfate with the size value thereof was measured.

For the purpose of reference the size value of the paper prepared by the use of hitherto well-known rosin maleic anhydride adduct sizing agent was measured, being compared with that mentioned above. The results were demonstrated in the following Table 5.

TABLE 5

| Amount of aluminum sulfate added (solid per pulp) percent | Size value (seconds) | | | |
|---|---|---|---|---|
| | Sizing agent and its amount added (per pulp) | | | |
| | Sizing agent (D) of this invention | | Goods (A) on the market | |
| | 0.5% | 2.0% | 0.5% | 2.0% |
| 0.2 | | 2 | | 0 |
| 0.5 | | 5 | | 1 |
| 0.1 | 3 | 15 | 0 | 1 |
| 1.7 | 4 | 22 | 1 | 5 |
| 2.0 | 6 | 23 | 1 | 15 |
| 3.0 | 8 | 25 | 2 | 18 |

The size value was measured in seconds and goods (A) on the market was a hitherto well-known rosin maleic anhydride adduct sizing agent.

Example 5

Some 625 parts of the cracked oil of naphtha having a boiling point of 145–175° C. 450 parts of a WW grade gum rosin and 27 parts of acrylonitrile were reacted by heating in an autoclave in the presence of 10 parts of a benzoyl peroxide as a catalyst in carbon dioxide stream at 150° C. for 13 hours. The content was distilled under the reduced pressure of 80 mm. Hg, the unreacted fraction distilled off when the temperature of the content was below 230° C. being removed. Some 612 parts of a light color, transparent polymer having a melting point of 58–60° C. (capillary method) and an acid number of 128 were obtained.

One hundred parts of the resin thus obtained were melted by heating to 130° C. The melted resin was thrown into the caustic soda aqueous solution heated to 70° C. in advance consisting of 13.2 parts of a caustic soda and 100 parts of water and the mixture was stirred at 90° C. for 1 hour, the resin being completely dissolved. A light color liquid saponified product was obtained. Next, this product was cooled to 60° C., water being gradually added thereto at said temperature, and the product was made into a solution containing 35% solids. The solution thus obtained was a light color, transparent and low-viscosity solution, which was named paper sizing agent (E) according to this invention.

Using this sizing agent (E), paper of 60 g./m.$^2$ was prepared from a bleached sulfite pulp (freeness 36° SR) by the same method as in Example 1. The size value and the burst strength thereof were measured. Comparing those figures, as in Example 1, with those of the paper prepared by the use of a hitherto well-known emulsion-type petroleum resin sizing agent on the market, the results demonstrated in the following Table 6 were obtained.

TABLE 6

| Amount of sizing agent added (solid per pulp) percent | Size value (seconds) | | Burst strength ratio (percent) | |
|---|---|---|---|---|
| | Sizing agent (E) of this invention | Goods (D) on the market | Sizing agent (E) of this invention | Goods (D) on the market |
| 0.75 | 15 | 8.7 | 1.90 | 1.83 |
| 1.0 | 24 | 21 | 1.81 | 1.76 |
| 1.5 | 30 | 23 | 1.76 | 1.53 |
| 2.5 | 35 | 28 | 1.70 | 1.50 |

Goods (D) on the market was a hitherto well-known emulsion-type petroleum resin sizing agent.

Example 6

Three hundred parts of the cracked oil of naphtha-rosin-maleic acid polymer (I) obtained in Example 1 and 35.6 parts of a paraformaldehyde were further reacted in carbon dioxide stream at 160° C. for 8 hours. Here 315 parts of a dark color, transparent polymer having a melting point of 77–80° C., 12° C. higher than that of the copolymer (I) and an acid number of 124 were obtained. By saponifying this product by the same method as in Example 1, paper sizing agent (F) was obtained. By the addition of 1.5% thereof to paper, this paper sizing agent (F) showed the size value of 28 seconds.

As will be apparent from the foregoing explanation, the water-soluble petroleum resin sizing agents of this invention have the following characteristics.

(1) Because they are in the state of complete aqueous solution, they are mechanically very stable and completely free from the coagulation as has often arisen in the case of a hitherto emulsion-type petroleum resin sizing agent. Accordingly, their use is very handy.

(2) Because many of them are very sensitive to an aluminium sulfate, the addition thereof to paper in small amounts results in uniform fixity thereof to the paper, thereby demonstrating an excellent sizing effect.

(3) Lowering of the paper strength due to said sizing agents is little; therefore, it is possible to obtain paper of high strength by the use thereof as compared with the paper prepared by the use of rosin-type sizing agents.

(4) Foaming is small. This contributes to eliminating the inferiority of the texture of paper due to foams and improves the operation efficiency.

(5) There is scarcely any change of the physical properties of the paper resulting from the time elapsing caused by sizing agents.

(6) Because the materials are inexpensive, it does not cost much to prepare the agents. Future supply at further reduced prices can be expected in concomitance with the development of the petrochemical industry.

It is possible to make various modifications without departing from the spirit and scope of this invention. It is therefore to be understood that the scope of the invention is not to be determined by the specific illustration herein given but by the appended claims:

We claim:

1. A method for preparing a water-soluble petroleum sizing agent comprising:
   (1) forming a polymer having an acid number in excess of 75 by reacting:
      (a) rosin,
      (b) an alpha-beta unsaturated organic compound selected from the group consisting of:
         (i) mono and dicarboxylic acids,
         (ii) anhydrides of (i),
         (iii) esters of (i) and alcohols having 1 to 4 carbon atoms, and
         (iv) nitriles of (i); and
      (c) an oil having a boiling point above 130° C. and containing as principal components unsaturated cyclic structures, said oil being produced by thermally cracking naphtha to produce ethylene, and,
   (2) alkali saponifying the polymer obtained in (1).

2. The method of claim 1 wherein (a) is selected from the group consisting of wood rosin, gum rosin and tall oil rosin, and (b) is selected from the group consisting of maleic acid, maleic anhydride, fumaric acid, and itaconic acid.

3. The method of claim 2 wherein the copolymerization of (a), (b) and (c) is carried out at 100 to 125° C. for 3 to 15 hours in the presence of a catalyst selected from the group consisting of a benzoyl peroxide and di-tertiarybutyl peroxide radical-type polymerization catalyst.

4. The method of claim 2 wherein the copolymerization of (a), (b) and (c) is carried out at 100 to 125° C. for 3 to 15 hours in the presence of a Friedel-Crafts type polymerization catalyst.

5. The method of claim 2 wherein 100 parts by weight of the polymer prepared by polymerizing (a), (b) and (c) are copolymerized with 2 to 6 parts by weight of aliphatic aldehydes having 1 to 4 carbon atoms by heating to 150 to 250° C., prior to alkali saponification.

6. The method described in claim 2, wherein the copolymerization is carried out in the presence of an acid catalyst.

7. The method of claim 2 wherein 100 parts by weight of the polymer prepared by polymerizing (a), (b) and (c) are copolymerized with 3 to 15 parts by weight of α,β-unsaturated polycarboxylic acids having 3 to 5 carbon atoms by heating to 150 to 250° C., prior to alkali saponification.

References Cited by the Examiner

UNITED STATES PATENTS

| 2,477,655 | 8/1949 | Rummelsburg | 260—97 |
| 2,502,080 | 3/1950 | Fenelon | 106—218 |

(Other references on following page)

| UNITED STATES PATENTS | | | |
|---|---|---|---|
| 2,776,277 | 1/1957 | Keim | 260—101 |
| 2,818,412 | 12/1957 | Eckhardt | 260—346.6 |
| 3,132,127 | 5/1964 | Strazdins | 260—97 |
| 3,193,449 | 7/1965 | Aldrich | 260—27 |
| 3,211,683 | 10/1965 | Arakawa | 260—27 |

FOREIGN PATENTS 509,084  1/1955  Canada.
595,416  3/1960  Canada.

LEON J. BERCOVITZ, *Primary Examiner.*

F. McKELVEY, *Assistant Examiner.*